March 29, 1932. F. B. WALDRON 1,851,609
GLASS ROLLING APPARATUS PARTICULARLY APPLICABLE TO
THE PRODUCTION OF CONTINUOUS GLASS STRIP
Filed Dec. 18, 1930
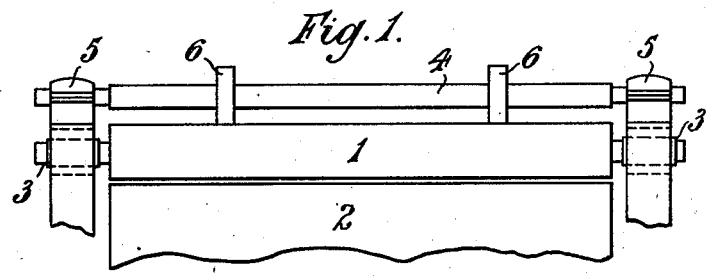
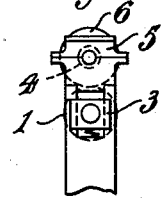
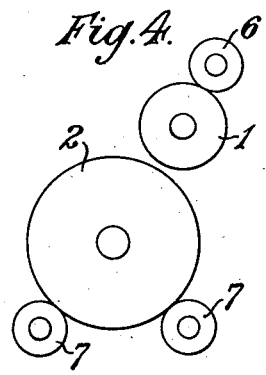
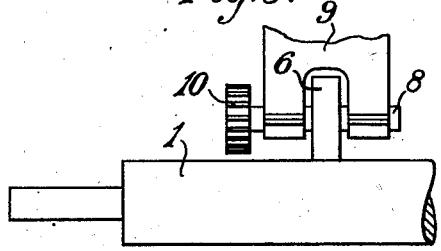

Patented Mar. 29, 1932

1,851,609

UNITED STATES PATENT OFFICE

FREDERIC BARNES WALDRON, OF PRESCOT, ENGLAND, ASSIGNOR TO PILKINGTON BROTHERS LIMITED, OF LIVERPOOL, ENGLAND, A COMPANY OF ENGLAND

GLASS ROLLING APPARATUS PARTICULARLY APPLICABLE TO THE PRODUCTION OF CONTINUOUS GLASS STRIP

Application filed December 18, 1930, Serial No. 503,200, and in Great Britain December 28, 1929.

This invention relates to apparatus for rolling glass and has for its object improvements in the rollers therefor and their mounting.

Rollers for glass are customarily mounted either in fixed bearings at their ends or in yielding bearings with collars on the ends of the rollers. The rollers become warped in use, with the result that the glass is rolled alternately thick and thin as the roller or rollers rotate.

According to the present invention a glass forming roller is mounted in yielding bearings and its position in a direction perpendicular to the glass being rolled, is determined by one or two auxiliary rollers mounted in fixed bearings having collars in rolling contact with the forming roller.

In the accompanying drawings:—

Figure 1 is a front view of part of the rolling apparatus;

Figure 2 is an end view of the same;

Figure 3 is a diagram showing the effect of distortion of a roller;

Figure 4 is a diagrammatic view of a set of rollers, and

Figure 5 is a front view of part of a rolling apparatus with an alternative form of auxiliary roller.

Referring to Figures 1 and 2, 1 is the upper roller of a rolling apparatus, of which 2 is the lower member, which may be either a roller or table. The roller 1 is yieldingly mounted in the bearings 3, whereby the roller 1 is capable of a small movement to and from the member 2. An auxiliary roller 4 is mounted in fixed bearings 5 and is provided with collars 6 which are in rolling contact with the roller 1.

By means of these collars 6, the position of the roller 1 and therefore the thickness of the glass being rolled is determined.

Referring to Figure 3, the curved line AB represents the axis of a warped roller, A and B being the bearing points thereof. Glass rolled by the warped roller AB, if held in fixed bearings at A and B, will have differences in thickness amounting to twice the length OC, as a maximum.

Now the glass strip rolled must always be narrower than the length of the roller, and always has defective edges which must be cut off. The useful width of glass strip rolled is taken to be between the points D and E, the line DE cutting the line OC at H. If the collars on the auxiliary roller are placed at points F and G, so that the point J (where the line FG cuts the line OC) is midway between O and H, then, when the position of the roller is determined by these collars instead of by the bearings at A and B, the maximum differences in thickness of the glass rolled are only twice OJ.

From this it is seen that the effect of a warped roller in producing glass of varying thickness is reduced to about one-quarter when the roller is mounted in accordance with this invention, as compared with a roller mounted in fixed bearings, a satisfactory result being attained when the collars on the auxiliary roller are separated by from one-half to two-thirds of the width of the glass being rolled.

If the roller, instead of being mounted in fixed bearings, is mounted in yielding bearings and provided with collars at its ends, these collars are in positions such as K and L, the distances KD and EL being sufficient to allow for the variations in the width of the glass that occur in practice and for the edge portions cut off. The use of these collars on the forming roller have, therefore, only a small effect in reducing the effect of a warped roller, and the effect, even in this case, is between three and four times the effect when the roller is mounted according to this invention.

When the rolling apparatus consists of two forming rollers, both rollers are preferably mounted in yielding bearings and are provided with auxiliary rollers having collars in rolling contact with their respective forming rollers.

Further, it is sometimes preferable to employ two auxiliary rollers for one or for both the forming rollers. Thus, in Figure 4, which shows diagrammatically a set of rollers, 1 and 2 are the two forming rollers, 6 are the collars of a single auxiliary roller determining the position of the roller 1, and 7 are the collars of two auxiliary rollers determining the position of the forming roller 2.

Since the ends of a warped roller of which the position is determined by one or more auxiliary rollers turn eccentrically or wobble, the forming rollers may be driven by the frictional contact of the collars on the auxiliary rollers, the driving means being applied to the latter.

The phrase "auxiliary rollers with collars" is intended to cover all mechanical equivalents thereof, such, for instance, as that shown in Figure 5, where 1 is the forming roller and 6 a collar on a short shaft 8 carried in bearings 9 and fitted with a gear wheel 10 by which it is driven. A similar collar on shaft and with bearings and driving means is fitted at the other end of the forming roller, and the two collars on their shafts form the equivalent of an auxiliary roller with collars.

The supports for the auxiliary rollers with collars are provided with the necessary adjustments for varying the dimensions of the pass, as are customary in the case of forming rollers in fixed bearings.

Having described my invention, I declare that what I claim and desire to secure by Letters Patent is:—

1. In apparatus for rolling glass, a roller for forming the glass, yielding bearings for said forming roller, at least one auxiliary roller having its axis parallel with that of the forming roller, fixed bearings for said auxiliary roller and collars on the auxiliary roller adapted to contact with the forming roller at points distinct from the edges of the glass being rolled by not more than one-quarter of the width of the said glass.

2. In apparatus for rolling glass, a roller for forming the glass, yielding bearings for said forming roller, at least one auxiliary roller having its axis parallel with that of the forming roller, fixed bearings for said auxiliary roller and two collars on the auxiliary roller located at a distance apart not less than one half and not greater than two-thirds of the width of the glass being rolled, said collars being in rolling contact with the forming roller to determine the position of the latter in a direction perpendicular to the glass being rolled.

3. In apparatus for rolling glass, two rollers for forming the glass, yielding bearings for the said forming rollers, at least one auxiliary roller associated with each forming roller having its axis parallel with that of the respective forming roller, and collars on each auxiliary roller in rolling contact with the respective forming roller at points distant from the edges of the glass being rolled by not more than one-quarter of the width of the said glass.

4. In apparatus for rolling glass, two rollers for forming the glass, yielding bearings for the said forming rollers, at least one auxiliary roller associated with each forming roller having its axis parallel with that of the respective forming roller, and two collars on each auxiliary roller located at a distance apart not less than one-half and not greater than two-thirds of the width of the glass being rolled, said collars being in rolling contact with the respective forming roller to determine the position of the latter in a direction perpendicular to the glass being rolled.

5. In apparatus for rolling glass, a roller for forming the glass, yielding bearings for said forming roller, at least one auxiliary roller having its axis parallel with that of the forming roller, fixed bearings for said auxiliary roller, driving means for said auxiliary roller, and collars on the auxiliary roller adapted to contact with and frictionally drive the forming roller, said collars also serving to determine the position of the forming roller in a direction parallel to the glass being rolled.

6. In apparatus for rolling glass, a roller for forming the glass, yielding bearings for said forming roller, at least one auxiliary roller having its axis parallel with that of the forming roller, fixed bearings for said auxiliary roller, driving means for the auxiliary roller, and two collars on the auxiliary roller located at a distance apart not less than one-half and not greater than two-thirds of the width of the glass being rolled, said collars being in rolling contact with the forming roller to frictionally drive the latter and to determine its position in a direction perpendicular to the glass being rolled.

7. In apparatus for rolling glass, two rollers for forming the glass, yielding bearings for the said forming rollers, an auxiliary roller associated with each forming roller and having its axis parallel with that of the respective forming roller, driving means for each auxiliary roller and collars on each auxiliary roller adapted to contact with and frictionally drive the respective forming roller, said collars also serving to determine the position of the last-named roller in a direction perpendicular to the glass being rolled.

8. In apparatus for rolling glass, two rollers for forming the glass, yielding bearings for the said forming rollers, an auxiliary roller associated with each forming roller and having its axis parallel with that of the respective forming roller, driving means for each auxiliary roller and two collars on each auxiliary roller located at a distance apart not less than one-half and not greater than two-thirds of the width of the glass being rolled, said collars being in rolling contact with and frictionally driving the respective forming roller and also serving to determine the position of the last-named roller in a direction perpendicular to the glass being rolled.

9. In apparatus for rolling glass, a roller for forming the glass, yielding bearings for said forming roller, two co-axial auxiliary rollers having their axes parallel with that of the forming roller, a fixed bearing for each of said auxiliary rollers, and two collars, one on each of said rollers, located at a distance apart not less than one-half and not greater than two-thirds of the width of the glass being rolled, said collars being in rolling contact with the forming roller to determine the position of the latter in a direction perpendicular to the glass being rolled.

In witness whereof I have affixed my signature hereto.

FREDERIC BARNES WALDRON.